United States Patent [19]

Gautier

[11] Patent Number: 5,349,617
[45] Date of Patent: Sep. 20, 1994

[54] APPARATUS FOR REMOVING THE RESIDUAL POWER OF A PRESSURIZED NUCLEAR REACTOR CORE

[75] Inventor: G. Marie Gautier, Pertuis, France

[73] Assignee: Commissariat a l'Engergie Atomique, France

[21] Appl. No.: 49,011

[22] Filed: Apr. 16, 1993

[30] Foreign Application Priority Data

Apr. 28, 1992 [FR] France ................. 92 05220

[51] Int. Cl.$^5$ ............................ G21C 15/18
[52] U.S. Cl. .................. 376/299; 376/298; 376/406
[58] Field of Search ............ 376/298, 299, 404, 405, 376/406

[56] References Cited

U.S. PATENT DOCUMENTS

| | | | |
|---|---|---|---|
| 3,305,450 | 2/1967 | Maldague | 376/406 |
| 3,322,641 | 5/1967 | Williamson et al. | 376/406 |
| 4,587,079 | 5/1986 | Fajeau et al. | 376/298 |
| 4,696,791 | 9/1987 | Straub | 376/299 |
| 4,767,594 | 8/1988 | Hunsbedt | 376/299 |

FOREIGN PATENT DOCUMENTS

| | | |
|---|---|---|
| 666103 | 6/1965 | Belgium . |
| 2500676 | 2/1981 | France . |
| 1-202694 | 8/1989 | Japan . |
| 2-98691 | 4/1990 | Japan . |
| 1026474 | 4/1966 | United Kingdom . |

OTHER PUBLICATIONS

A Water Level-Initiated Decay Energy Cooling System, Charles W. Forsberg, Nuclear Technology 96 (Nov., 1991), pp. 229-235.

Primary Examiner—Daniel D. Wasil
Attorney, Agent, or Firm—Hayes, Soloway, Hennessey, Grossman & Hage

[57] ABSTRACT

A pressured-water nuclear reactor comprising an apparatus for directly removing the residual power from the core of the reactor is provided. Advantageously, upon shut-down of the nuclear reactor of the present invention, residual power of the reactor may be safely removed therefrom.

6 Claims, 3 Drawing Sheets

APPARATUS FOR REMOVING THE RESIDUAL POWER OF A PRESSURIZED NUCLEAR REACTOR CORE

BACKGROUND OF THE INVENTION

1. Field of the Invention

The present invention relates in general terms to pressurized water nuclear reactors and more specifically relates to the problem of the need of removing the residual power or after-power from the core in the case of a programmed or accidental reactor shutdown.

2. Brief Description of Related Art

Firstly the term residual power will be defined. On shutting down a reactor by introducing a high antireactivity into the core, the number of fissions in the latter becomes very rapidly negligible after a few seconds. However, the radioactivity of the fission products developed in the core during the normal reactor operating period continues to release a significant power, which can represent approximately 7% of the operating power at the time of reactor shutdown. Therefore, no matter why the shutdown has taken place and in particular when it occurs as a result of a depressurization incident with respect to the primary circuit, it is necessary to have means for removing said residual power or after-power from the core without the heating leading to catastrophic conditions and which could even bring about core meltdown.

Conventionally three means have been used up to now for removing the residual power from pressurized water reactors. They are constituted by the steam generator, the system for cooling the reactor on shutdown and the safety injection device for accidental situations.

The steam generator, whose normal function is to absorb heat, can obviously continue to serve a heat exchange function with the primary water following reactor shutdown. This process, which can last several hours, becomes inoperative when the pressure and temperature respectively drop to approximately 30 bars and 180° C. Thus, the steam generators and secondary circuit are not designed for removing heat at low temperature and low pressure.

As from this time it is the system for cooling the reactor on shutdown which comes into action by injecting cold water into the primary circuit. Thus, within about 15 hours it is possible to bring the core to a temperature below about 100° C.

The safety injection circuit ensures the emergency cooling of the core and the rapid insertion of antireactivity into it in all cases where there is an accidental depressurization of the primary circuit and which can even lead to a complete break in said circuit. It fulfils its function by as rapidly as possible injecting boric acid cooling solution into the reactor core.

These various means, whose operation is satisfactory unfortunately suffer from a number of deficiencies, which will be given hereinafter.

The distance between the cold air source and the core can lead to an inadequate operation of these means. Thus, the more equipment existing between the core and the cold source, the greater the failure risk (pipe breaks, poor operation of a valve, motor, etc.).

The design of the steam generator only enable it to operate at high pressures and temperatures. At low pressures and temperatures, the shutdown reactor cooling system is used for removing the residual power. Generally, the operational overlap range of the two systems is narrow and requires a special procedure.

During intervention on the steam generator, the water level in the primary circuit is at mid-height in the hot and cold pipes and the shutdown reactor cooling system openings are just below this level. Special precautions relative to the operation of the shutdown reactor cooling system have to be taken, so as to avoid any air entrainment risk and the formation of vortexes leading to the disappearance of the residual power removal function.

Following a primary coolant loss incident, the steam generators and shutdown reactor cooling system can become completely unavailable, even on a long term basis. The only way to remove the residual power is the safety injection device, which is an active system. However, in this hypothesis, a possible disappearance of electric sources leads to a stoppage to the removal of the residual power.

As has been shown, existing systems may be defective and this may lead to serious consequences for the reactor and its environment.

Various solutions have already been proposed for improving the safety of the nuclear reactor residual power removal apparatus. Virtually all the solutions proposed consist of introducing an auxiliary heat exchanger into the reactor vessel. Reference can be made in this connection to the CEA FR-A-8,103,632, which recommends the introduction of an exchanger into the reactor vessel for extracting the heat from the heat transfer fluid without using loops. However, in order for such a system to be effective, it is necessary for the heat transfer fluid to be able to flow between the core and the exchanger. This arrangement within the actual vessel is not described and the vessel design proposed is completely different from that of presently used vessels.

Other documents, such as the article "A water level initiated decay energy cooling system" by Charles W. Forsberg, Oak Ridge National Laboratory, pp. 229 ff, Nuclear Technology, Vol. 96, November 1991, also describe water reactors with integrated exchangers for removing residual power. These are astute "heat switch" systems controlling the heat exchange between the primary circuit and the exchanger. However, these systems are cumbersome, are not compatible with existing pressurized water reactors and are really intended for other reactor types.

SUMMARY OF THE INVENTION

The present invention relates to an apparatus for removing the residual power from the core of a reactor making it possible, by using as in the prior art apparatus an auxiliary exchanger within the vessel, to solve the aforementioned problems in all cases where the vessel remains filled with primary water.

This apparatus for removing the residual power from the core of a pressurized water nuclear reactor, having a primary water circulation in accordance with a hairpin path in the reactor vessel and for this purpose having two concentric ferrules defining an external annular compartment, in which the cold primary water describes a downward path and a central cylindrical compartment containing the actual core, in which the primary water flows from bottom to top, accompanied by heating, through the core, is characterized in that it comprises a third ferrule defining a complementary annular space between the two preceding compartments, said annular space being linked in its lower part by a first orifice issuing into the external annular compartment with the cold water of the primary circuit and in its upper part and by a second orifice issuing into the central compartment with the hot water of the primary circuit and an auxiliary heat exchanger located in said complementary annular space, said auxiliary exchanger being supplied autonomously by a second heat transfer fluid, which is independent of the primary cooling water of the reactor core.

The presence of a third ferrule and a complementary annular space between the core and the periphery of the vessel consequently makes it possible to create an area in which there is a flow of primary water, either by the vacuum or pressure drop effect when the primary circuit is still operating, or by a thermosiphon effect if the latter flow is interrupted. The auxiliary heat exchanger located in the complementary annular space formed in this way is supplied independently of said primary circuit by a second heat transfer fluid able to issue to the outside of the reactor on any cold source such as a condenser, air cooler, etc., so that the apparatus according to the invention in all circumstances ensures a good removal of the residual core power, even following reactor shutdown.

According to an important feature of the present invention, following the closure of the first orifice, the removal apparatus comprises means for increasing the vacuum effect in the vicinity of the bottom of the complementary annular space. It is sometimes necessary to use these means when the pressure drop of the primary liquid through the core becomes excessive and would compromise the primary fluid flow in the complementary annular space housing the auxiliary heat exchanger.

Two particularly interesting embodiments are envisaged within the scope of the present invention for obtaining these vacuum effect increasing means.

In a first embodiment, said means for increasing the vacuum effect incorporate means for closing the first orifice and a series of radial, cylindrical pipes extending, in the vicinity of the base of the core, in the external annular compartment, said cylindrical, radial pipes issuing onto openings provided for this purpose every so often on the periphery of the lower portion of the intermediate ferrule in the complementary annular space and being provided on their wall with longitudinal slots for linking with the external annular compartment.

In this first embodiment, it is the flow of the primary water around the longitudinal slots of the cylindrical pipes, which creates a greater pressure reducing or vacuum effect than could be obtained with the first orifice of the overall apparatus. In this connection, the best results are obtained when there are two such longitudinal slots for communicating with the external annular compartment on each pipe and when their azimuth position on the surface of the cylindrical pipes forms an angle $\phi$ close to 80° in the main downward flow direction in the external annular compartment.

In the second embodiment of the means for increasing the vacuum effect, the apparatus has in the external annular compartment below the auxiliary heat exchanger, an annular chamber linked by a series of openings with the complementary annular space and by an annular slot with the external annular compartment, said annular chamber having an extension in the radial direction of the vessel much that it creates in the external annular compartment, a constriction or narrowing which brings about an increase, at the location of the preceding slot, of the flow rate of the downward primary fluid in said external annullar compartment of the auxiliary heat exchanger.

In this embodiment, the physical principle applied is similar to the previous one to the extent that the increase of the vacuum effect is simultaneously obtained by the positioning of the slot in an area where the flow of fluid brings about a vacuum and by a restriction of the channel offered in the external annular compartment to the primary water flow.

BRIEF DESCRIPTION OF THE DRAWINGS

The invention is described in greater detail hereinafter relative to non-limitative embodiments and with reference to the attached drawings, wherein show.

DETAILED DESCRIPTION OF THE PREFERRED EMBODIMENTS

Figure 1:
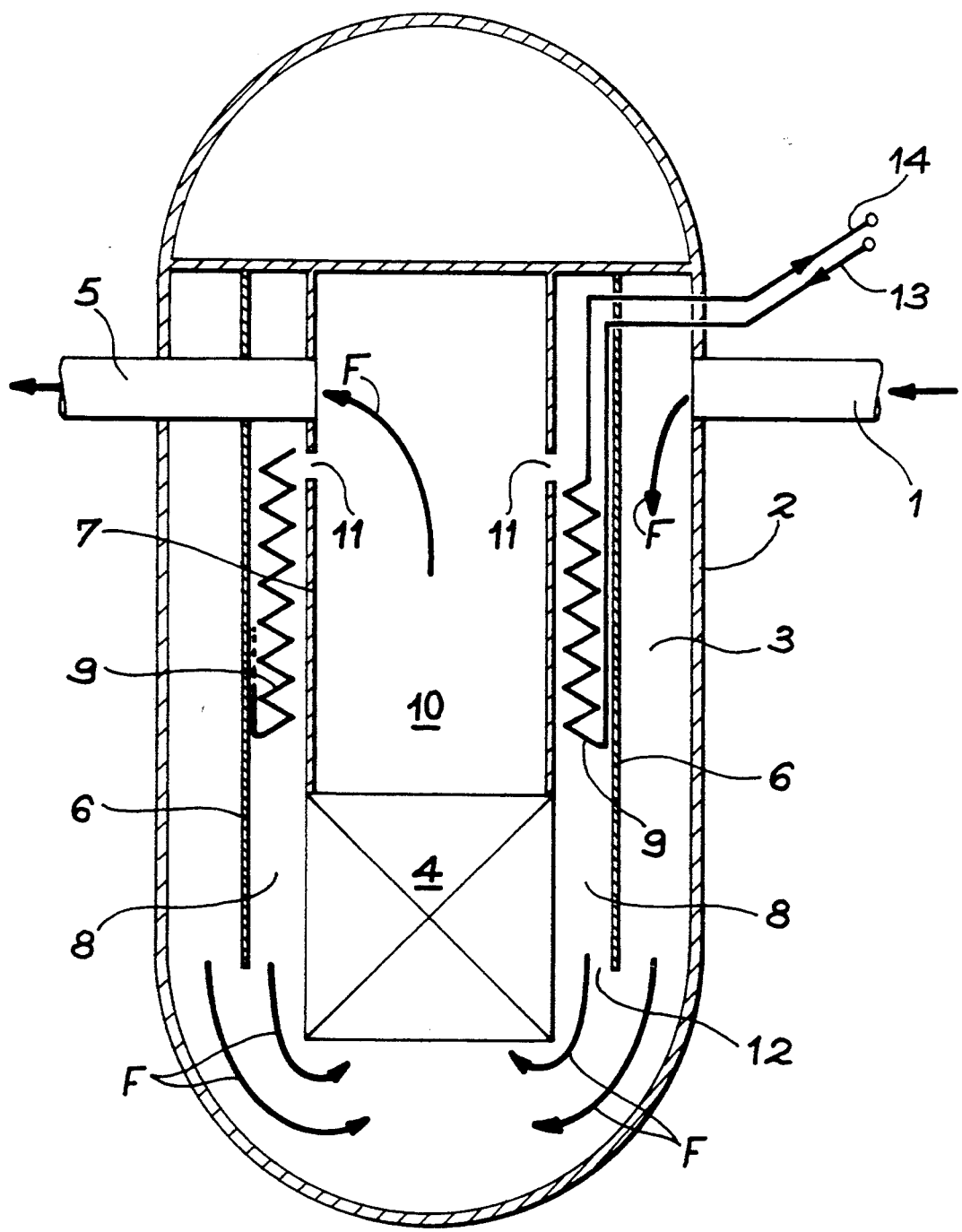
FIG. 1 an axial sectional view of a pressurized water nuclear reactor equipped with the apparatus according to the invention.

FIG. 1 diagrammatically shows in section the vessel of a pressurized water nuclear reactor. In this reactor, which is provided with the residual power removal apparatus according to the invention, there are obviously the basic components for such installations, namely several inlets 1 supplying cold water at the top of the vessel 2, said water flowing in accordance with the path indicated by the arrows F in the drawing, i.e. firstly downwards into an external annular compartment 3 and then in accordance with a hairpin path rising through the core 4, where heating takes place and the heat will be used in the not shown steam generator. For this purpose the hot water leaves the vessel through one or more pipes 5, after traversing the external annular compartment 3 with the aid of per se known devices. The circulation system described hereinbefore relates to the primary water circuit, which then supplies the not shown steam generator. The steam which is produced is used for the operation of the turbines and then one or more alternators.

In order to remove the residual power or after-power produced by the core 4 after a chain reaction shutdown, the apparatus according to the invention essentially comprises a supplementary or third ferrule 7 defining with the internal ferrule 6 of the external compartment 3 a complementary annular space 8. According to the invention, said annular space 8 has one or more heat exchangers 9 autonomously supplied by a second heat transfer fluid entering at 13 and leaving at 14. This secondary heat transfer fluid makes it possible to remove from the vessel the desired power and in turn exchanges its heat with a random known cold source, e.g. an air cooler, condenser, etc. This secondary heat transfer fluid can be of a random nature and can be in single or two-phase form. In the case of a water reactor, in advantageous manner said secondary fluid is constituted by ordinary water.

In order that such an apparatus is effective, it is necessary for the water to continuously circulate in the reactor vessel between the core and the exchanger and for said circulation to disturb the normal reactor operation to the minimum extent. The present invention describes the internal arrangement of the vessel in order to bring about this circulation.

It is necessary for the hot water of the core to be able to flow along the exchanger 9 and for this purpose two means are provided. The first means is a first orifice 12 located in the lower part of the complementary annular space 8 linking the latter with the downward part of the cooling cold water prior to its entry into the core. The second means is a second orifice 11 located in the third ferrule 7 above the exchangers 9 and below the intake tube 1 and outlet tube 5 for the primary water. Usually there are several orifices 11 and there are a certain number of holes distributed over the periphery of the third ferrule 7. Thus, the complementary annular space 8 communicates with the space located above the core 4 and known as the upper plenum.

The flow of hot water to be cooled in the complementary annular space 8 along the exchangers 9 takes place under the effect of two different processes which, according to the particular case, may act simultaneously or separately depending on whether the primary water does or does not flow in the reactor.

Thus, if said primary water does flow, its rate is sufficient to create at the first orifice 12 a vacuum in the complementary space 8, which sucks the hot water into said space from the upper plenum 10 through orifices 11.

However, if the flow of primary water is stopped, the system is dimensioned and designed in such a way that the residual heat released by the core is adequate for producing a thermosiphon effect, which leads to a circulation of the hot water in accordance with a downward path in the complementary annular space 8.

As has been already stated, the cold heat transfer fluid enters by the pipe 1, descends through the annular space 3 and rises into the core 4, where it is heated and loses pressure before passing out of the vessel at 5. In the lower part of the compartment 3, a vacuum is created in the annular space 8. As this vacuum exceeds the pressure drop in the core 4, the fluid in 8 is then sucked by the fluid from 3. Therefore there is a downward heat transfer fluid path in the annular space 8. When the fluid from the loop 1 is no longer available (e.g. during a break or stoppage of the not shown pumps), a natural flow is established between the core and the exchangers 9 via the orifices 11 and 12. The interest of this arrangement of the components in the vessel is that the fluid passing through the space 8 is moved by complementary forces, one being the forced convection due to the main circulation from the loop 1, whilst the other is natural convection. One or other of the two forces is necessary. There is no flow direction reversal during the passage from one force to the other or during the disappearance of one of the forces. Therefore this apparatus makes it possible to extract power from the reactor, no matter what the pressure and temperature levels of the primary heat transfer fluid and no matter what the state of the loops.

It is pointed out that if the pressure drops of the core 4 become excessive, a complementary device for improving the vacuum effect should be installed at the link 12. For example, such devices are shown in FIGS. 2 and 3.

Figure 2:
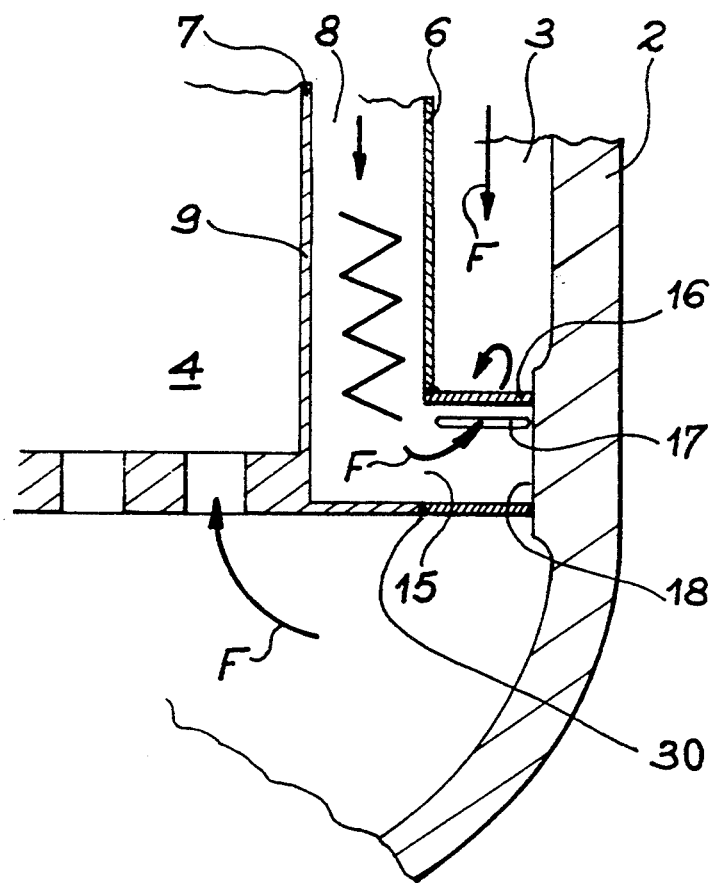
FIG. 2 a sectional view of the same reactor when using the first embodiment of the vacuum effect increasing means.

FIG. 2 shows the first embodiment of the means for increasing the vacuum, the opening at 12 having been partially closed by means 30 and replaced by a series of small openings 15 positioned radially on the ferrule 6. By means of a series of cylindrical or almost cylindrical radial pipes 16, which radially traverse the annular space 3, these openings 15 communicate with the external compartment 3. On each of the pipes there are two longitudinal slots 17 for communication with the annular space 3. The azimuth position of these slots forms an angle $\phi$ close to 80° with the main downward flow direction in the annular space 3, so as in this way to create a greater vacuum effect. As the suction effect is also linked with the speed of the downward fluid flow in the annular space 3, a local narrowing 18 of said space to the right of the slots makes it possible, if necessary, to improve the vacuum effect.

Figure 3:
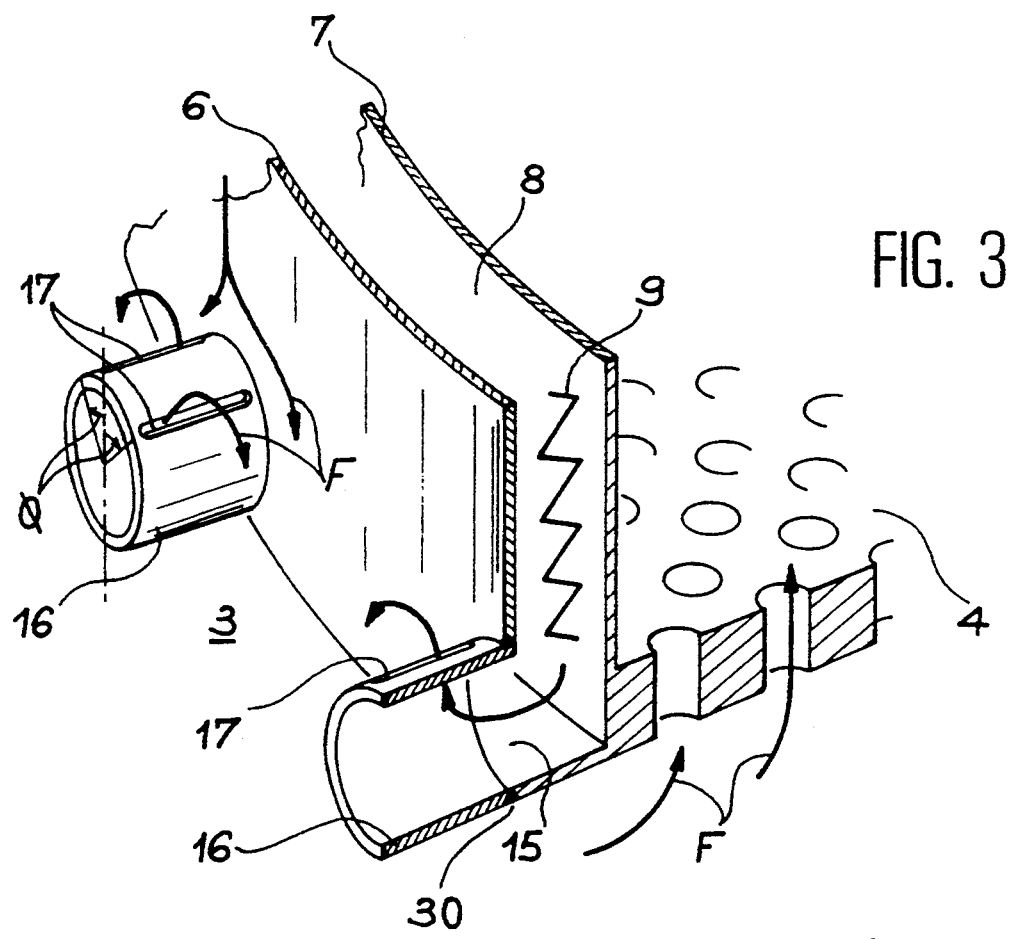
FIG. 3 a semi-exploded perspective view after removing the outer vessel of the reactor showing the apparatus of FIG. 2.

Following the removal of the vessel 2, FIG. 3 shows two radial pipes 16, in perspective and with one broken away, on the wall 6 of the external annular compartment. Arrow F indicates the reentry path into the core 4 of the water from the complementary annular space 8 through the radial pipes 16 and the slots 17.

Figure 4:
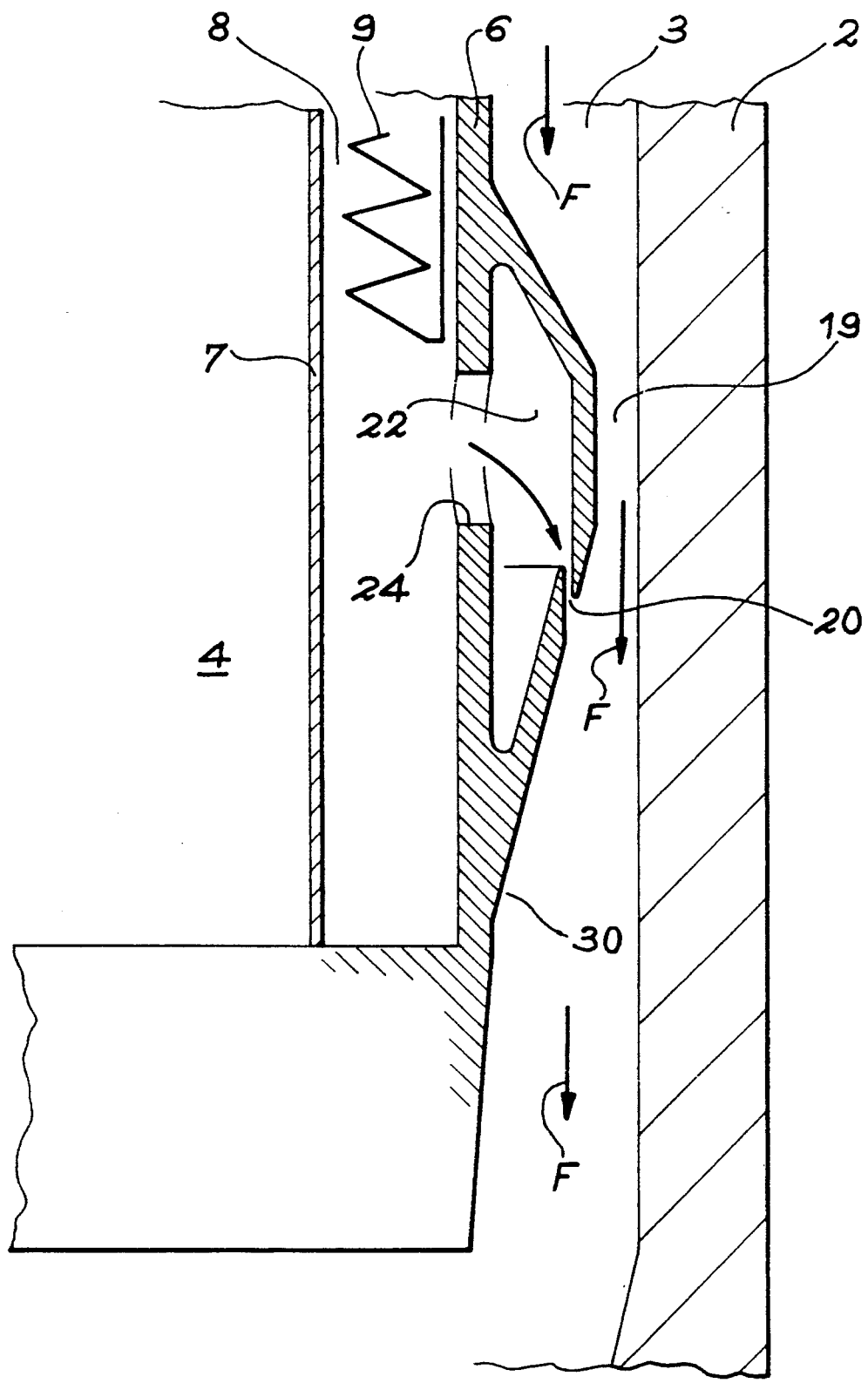
FIG. 4 an axial sectional view of second means for increasing the vacuum effect.

FIG. 4 is used for illustrating the second embodiment of the means for increasing the vacuum in the annular space 8. On the ferrule 6 or the vessel 2 and below the lower part of the exchanger 9, a narrowing 19 is created in order to increase the speed of the fluid descending into the space 3. Towards the location where the speed is highest, a slot 20 in an annular chamber 22 and passing round the ferrule 6 permits the communication between the annular space 8 and the annular space 3. Obviously, the communication 12 is partially blocked by means 30. The annular space 22 communicates by the orifices 24 with the complementary annular space 8.

The communication 11 between the annular space 8 and the upper plenum 10 can be in the form of a series of holes. An optional option for improving the system by creating an overpressure is for said communications to be constituted by short pipes, whereof one side is fixed to the aforementioned holes and whose other end is on the side of the upper plenum 10 with the orifice turned facing the main flow direction in the plenum 10.

To aid natural convection, the exchanger 9 is positioned as high as possible with respect to the core 4. The communication 11 must be above the exchanger 9, but below the pipes 1 and 5, because the latter determine the minimum water level in the vessel.

I claim:

1. A pressurized water nuclear reactor, comprising:
   a. a vessel forming a first ferrule (2);
   b. a second ferrule (6) contained in the vessel (2) and concentric therewith, said first and second ferrules defining an external annular compartment (3) through which primary coolant flow water circulates to provide a hairpin-shaped flow path F of said primary coolant from top to bottom of said vessel (2);
   c. a central cylindrical compartment (10) containing a core (4) for heating said water, said flow path F of primary water continuing from the bottom of said vessel, through said core, to the top of cylindrical compartment;
   d. an apparatus for removing residual power from the core of said reactor, said apparatus comprising a third ferrule (7) defining a complementary annular space (8) between said external annular compartment (3) and said central cylindrical compartment (10), said complementary annular space (8) including a first orifice (12) for permitting communication of flow water between a lower part of said complementary annular space (8) and a lower part of said external annular compartment (3), said complementary annular space (8) also including a second orifice (11) for permitting communication of flow water between said cylindrical compartment (10) and an upper part of said complementary annular space, said apparatus also comprising at least one self-contained auxiliary heat exchanger (9) for removing said residual power, said heat exchanger being located in said complementary annular space (8) and being supplied autonomously with a second heat transfer fluid separate from said flow water; and e. means for increasing vacuum effect in the vicinity of the lower part of the complementary annular space, wherein said means for increasing vacuum effect comprises means for partially closing the first orifice and a series of cylindrical radial pipes (16) extending, in the vicinity of the base of the core, into the external annular compartment (3), said cylindrical radial pipes (16) issuing onto openings (15) provided on the periphery of the lower part of the intermediate ferrule in the complementary annular space and being provided on their wall with longitudinal slots (17) for communication with the external annular compartment (3).

2. A reactor according to claim 1, wherein there are two such longitudinal communicating slots (17) on each pipe (16) said slots being positioned azimuthly on the surface of the cylindrical pipes at an angle $\phi$ close to 80° with the main flow path in the external annular compartment (3).

3. A pressurized water nuclear reactor, comprising:
a. a vessel forming a first ferrule (2);
b. a second ferrule (6) contained in the vessel (2) and concentric therewith, said first and second ferrules defining an external annular compartment (3) through which primary coolant flow water circulates to provide a hairpin-shaped flow path F of said primary coolant from top to bottom of said vessel (2);
c. a central cylindrical compartment (10) containing a core (4) for heating said water, said flow path F of primary water continuing from the bottom of said vessel, through said core, to the tope of said cylindrical compartment;
d. an apparatus for removing residual power from the core of said reactor, said apparatus comprising a third ferrule (7) defining a complementary annular space (8) between said external annular compartment (3) and said central cylindrical compartment (10), said complementary annular space (8) including a first orifice (12) for permitting communication of flow water between a lower part of said complementary annular space (8) and a lower part of said external annular compartment (3), said complementary annular space (8) also including a second orifice (11) for permitting communication of flow water between said cylindrical compartment (10) and an upper part of said complementary annular space, said apparatus also comprising at least one self-contained auxiliary heat exchanger (9) for removing said residual power, said heat exchanger being located in said complementary annular space (8) and being supplied autonomously with a second heat transfer fluid separate from said flow water; and e. means for increasing vacuum effect in the vicinity of the lower part of the complementary annular space, wherein the means for increasing vacuum effect comprises means for partially closing the first orifice and in the external annular compartment (3) below the auxiliary heat exchanger (9), an annular chamber (22) linked by a series of openings (24) with the complementary annular space (8) and, by an annular slot (20), with the external annular compartment (3), said annular chamber (22) having an extension in the radial direction of the vessel (2) such that it creates, in the external annular compartment (3), a narrowing (19) which leads to an increase, at the location of the slot (20), to the flow rate of the primary flow descending into the external annular compartment (3) of the auxiliary heat exchanger (9).

4. A pressurized water nuclear reactor including a reactor vessel (2) having a primary water circulation in accordance with a hairpin path in the reactor vessel (2) and having two concentric ferrules (2, 6) defining an external annular compartment (3), in which cold primary water describes a downward path and a central cylindrical compartment (10) containing the actual core (4), in which the primary water flows from bottom to top, accompanied by heating, through the core, a third ferrule (7) defining a complementary annular space (8) between the two preceding compartments (3, 10), said annular space (8) being linked in this lower part by a first orifice (12) issuing into the external annular compartment (3) with the cold water of the primary circuit and in its upper part and by a second orifice (11) issuing into the central compartment (10) with the hot water of the primary circuit and an auxilliary heat exchanger (9) located in said complementary annular space (8), said auxiliary exchanger (9) being supplied autonomously by a second heat transfer fluid, which is independent of the primary cooling water of the reactor core, and means for increasing vacuum effect in the vicinity of the lower part of the complementary annular space, said means for increasing the vacuum effect incorporating means for partially closing the first orifice and a series of cylindrical radial pipes (16) extending, in the vicinity of the base of the core, into the external annular compartment (3), said cylindrical radial pipes (16) issuing onto openings (15) provided on the periphery of the lower part of the intermediate ferrule in the complementary annular space and being provided on their wall with longitudinal slots (17) for communication with the external annular compartment (3).

5. A reactor according to claim 4, wherein there are two such longitudinal communicating slots (17) on each pipe (16), said slots being positioned azimuthly on the surface of the cylindrical pipes at an angle $\phi$ close to 80° with the main downward flow direction in the external annular compartment (3).

6. A reactor according to claim 4, wherein the means for increasing vacuum effect comprises means for partially closing the first orifice and, in the external annular compartment (3) below the auxiliary heat exchanger (9), an annular chamber (22) linked by a series of openings (24) with the complementary annular space (8) and, by an annular slot (20), with the external annular compartment (3), said annular chamber (22) having an extension in the radial direction of the vessel (2) such that it creates, in the external annular compartment (3), a narrowing (19) which leads to an increase, at the location of the slot (20), to the flow rate of the primary flow descending into the external annular compartment (3) of the auxiliary heat exchanger (9).

* * * * *

UNITED STATES PATENT AND TRADEMARK OFFICE
CERTIFICATE OF CORRECTION

PATENT NO. : 5,349,617
DATED : September 20, 1994
INVENTOR(S) : Guy Marie GAUTIER It is certified that error appears in the above-identified patent and that said Letters Patent is hereby corrected as shown below:

Claim 3, col. 7, line 44 "tope" should be --top--.

Signed and Sealed this

Third Day of January, 1995

Attest:

BRUCE LEHMAN

Attesting Officer

Commissioner of Patents and Trademarks